UNITED STATES PATENT OFFICE 2,361,481

RED MONAZO WOOL DYES

Donovan E. Kvalnes, Penns Grove, N. J., assignor to E. I. du Pont de Nemours & Company, Wilmington, Del., a corporation of Delaware No Drawing. Application November 18, 1941, Serial No. 419,528

8 Claims. (Cl. 260—198)

This invention relates to monazo dyes which are suitable for dyeing wool in shades of red and to processes of manufacturing the same, and especially to monazo dyes resulting from suitably coupling the diazos of a class of 2-amino-diphenyl-sulfones with gamma acid or a class of derivatives thereof.

Red monazo dyes for wool have heretofore been prepared by coupling the diazo of certain monoacidyl derivatives of diamino diphenyl sulfones with gamma acid wherein the monoacidyl group is substituted in the same benzene ring as the primary amino group. The dyeings made on wool with these dyes are undesirably blue and dull in shade and their light fastness is not entirely satisfactory. Red monazo dyes have been made wherein the coupling component is gamma acid and the diazo component is 2-amino-diphenyl-sulfone. These dyes have very good light fastness and shade, but it is desired to provide dyes which have a satisfactory and good light fastness and which operate to better advantage in neutral dyebaths.

It is among the objects of the present invention to provide monazo dyes which produce red dyeings on wool that are very fast to light and that are capable of dyeing well from neutral as well as from acid solutions thereof. Another object of the invention is to provide such red monazo dyes which dye wool economically from neutral baths and give bright dyeings having good fastness to light and wet treatments. Another object of the invention is to provide such dyes which may be used to dye wool economically from acid baths wherein excellent transfer of the dye occurs and which produce completely level and uniform shades. Still other objects of the invention will be apparent from the following description.

The objects of the invention are accomplished in general by coupling the diazo of certain of the diamino diphenyl sulfones of the general type which are represented by the formula

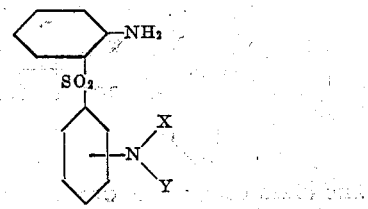

with gamma acid or certain derivatives thereof which are represented in general by the formula

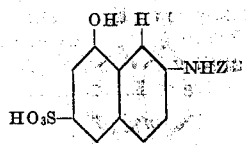

and coupling in media such that the coupling occurs in the 1-position of the naphthalene ring as indicated by the symbol —H.

The invention will be more fully set forth in the following more detailed description which includes examples that are given as illustrative embodiments of the invention and not as limitations thereof. Parts are expressed in parts by weight unless otherwise noted.

Example 1

Three hundred twenty-six and one-half parts of the hydrochloride of 2-amino-4'-acetylamino-diphenylsulfone are added to 2,000 parts of water and 73 parts of hydrogen chloride. Ice is added to the stirred mixture to lower the temperature to 0–5° C. Sixty-nine parts of sodium nitrite dissolved in 200 parts of water are added as rapidly as diazotization proceeds. After stirring for two to three hours, the diazo solution is filtered, the residue washed well and the filtrate is treated with sulfamic acid to destroy any excess nitrous acid. A solution of 239 parts of 2-amino-6-sulfo-8-naphthol in 2500 parts of water and 40 parts of sodium hydroxide is cooled to 0° C. with ice. The diazo solution is added rapidly to the solution of the coupling component. The mineral acidity is destroyed by the gradual addition of an adequate amount of a sodium acetate solution. When the solution is no longer acid to Congo red paper, the coupling proceeds rapidly. The dye is isolated by making the solution alkaline with sodium hydroxide, salting 5–10% and filtering. The dry product dyes wool a pleasing shade of red which has very good light fastness and good fastness to wet treatments. It dyes wool fairly well (about 40%) from a neutral solution. The dye is represented by the formula

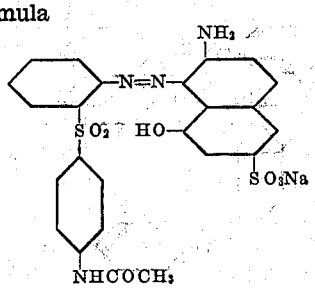

Example 2

Three hundred eighty-six and one-half parts of the hydrochloride of 2-amino-4'-benzoyl-amino-diphenylsulfone are used instead of the diazo component in the procedure described in Example 1. The product is represented by the formula

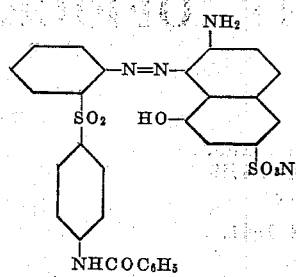

Dyeings made on wool with this product have nearly the same shade as the dyeings made from the product of Example 1. However, this product has greater ability to dye wool from a neutral solution than the dye of Example 1.

Example 3

Sixty-nine parts of sodium nitrite are added gradually below 25° C. to 1500 parts of monohydrate. Stirring is continued until a solution is obtained. Then 402 parts of 2-amino-4'-(tolyl sulfonylamino)-diphenylsulfone are added gradually and the mixture stirred at 25° C. for four hours. The solution is then poured upon ice and the diazo solution filtered. The latter is added to a solution of 2-amino-6-sulfo-8-naphthol, as prepared in Example 1. Eighty-two parts of sodium acetate are added, followed by the slow addition of sodium hydroxide, at 0–5° C., to destroy the Congo acidity. At this point coupling is rapid. The dye is isolated as described in Example 1. The product is represented by the formula

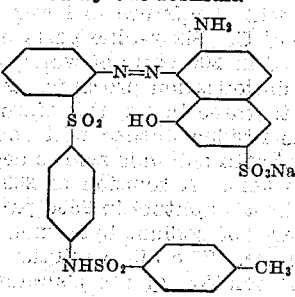

The product produces dyeings on wool in red shades having good fastness properties.

Example 4

By proceeding in accordance with Example 3 but using 418 parts of 2-amino-4'-(para-tolyl-sulfonyl-methyl-amino)-diphenylsulfone instead of the diazo component described therein a product is obtained which is represented by the formula

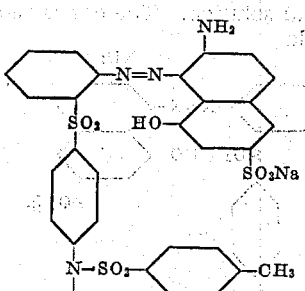

This product is quite suitable for the dyeing of wool under neutral conditions giving red shades of good fastness properties.

Example 5

By proceeding in accordance with Example 1 but using 356.5 parts of the hydrochloride of 2-amino-4'-carboethoxyamino-diphenylsulfone instead of the diazo component described therein, a dye is obtained which is represented by the formula

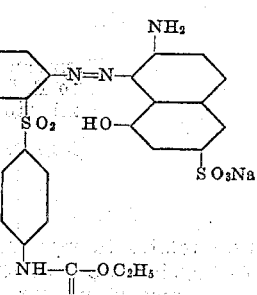

The properties of this product are closely similar to the properties of the dye of Example 1.

Example 6

By proceeding in accordance with Example 1 but using 253 parts of 2-methyl-amino-6-sulfo-8-naphthol instead of the coupling component described therein, a product is obtained which is represented by the formula

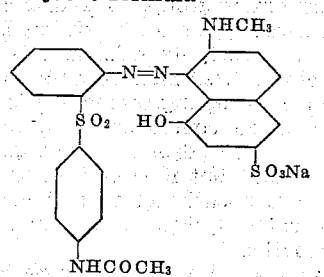

This product yields bluer shades of red than the product of Example 1.

A dye similar to the above described N-methyl derivative is obtained by using 2-(hydroxy-ethyl-amino)-6-sulfo-8-naphthol as the coupling component instead of 2-methyl-amino-6-sulfo-8-naphthol.

Example 7

By proceeding in accordance with Example 1 except that an equivalent amount of the hydrochloride of 2-amino-2'-acetyl-amino diphenylsulfone is used instead of the diazo component described therein, a dye having nearly the same shade and properties as those of the dye described in Example 1 is produced. It is represented by the formula

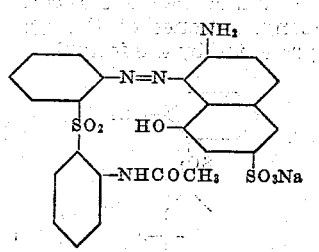

The diazo component was prepared by reacting ortho-nitro-chlor-benzene with one equivalent of sodium hydrogen sulfide, followed by reaction with a second mole of ortho-nitro-chlorbenzene to give 2-nitro-2'-amino-diphenylsulfide. This product was dissolved in acetic acid, converted to the 2'-acetyl-amino compound by treatment with acetic anhydride and then converted to the corresponding sulfone by reaction with 30% hydrogen peroxide. The 2-nitro-2'-acetyl-amino diphenylsulfone thus obtained was then reduced catalytically to produce the 2-amino-2'-acetylamino-diphenylsulfone.

The diazo component used in Example 1 was prepared by a similar series of reactions except that in the first step para-nitro-chlor-benzene was used instead of ortho-nitro-chlor-benzene. The 2-amino-4'-acetyl-amino-diphenylsulfone also was prepared by condensing the sodium salt of para-acetyl-amino-benzene-sulfinic acid with ortho-nitro-chlor-benzene in an autoclave at 140°–150° C. using methyl alcohol as a solvent. The product thus obtained was catalytically reduced.

The diazo components of Examples 2, 3 and 5 were prepared by use of benzoyl chloride, para-tolyl-sulfonyl chloride and ethyl-chloro-formate in place of acetic anhydride at the appropriate point in the general procedure outlined above.

The diazo component of Example 4 was prepared by treating an alkaline solution of 2-nitro-4'-para-tolyl-sulfonyl-amino-diphenyl sulfide with dimethyl-sulfate. This methyl derivative was oxidized to the sulfone and the nitro group reduced.

As illustrative of other primary arylamines which produce dyes having similar properties when used as diazo components in accordance with the foregoing examples are mentioned 2-amino-4'-propionyl-amino-diphenyl-sulfone,
2-amino-4'-para-chlor-benzoyl-amino-diphenyl-sulfone,
2-amino-4'-carbomethoxy-amino-diphenyl-sulfone,
2-amino-4'-benzene-sulfonyl-amino-diphenyl-sulfone,
2-amino-4'-para-tolyl-sulfonyl-ethyl-amino-diphenyl-sulfone,
2-amino-4'-para-tolyl-sulfonyl-hydroxy-ethyl-amino-diphenyl-sulfone,
2-amino-4'-para-tolyl-sulfonyl-sulfato-ethyl-amino-diphenyl-sulfone,
2-amino-4'-para-tolyl-sulfonyl-carboxy-methyl-amino-diphenyl-sulfone,
2-amino-4'-para-tolyl-sulfonyl-beta-sulfo-ethyl-amino-diphenyl-sulfone,
2-amino-4'-benzene-sulfonyl-butyl-amino-diphenyl-sulfone,
2-amino-4'-benzene-sulfonyl-benzyl-amino-diphenyl-sulfone,
2-amino-4'-[para-(meta-sulfo-benzoyl)-amino] diphenyl-sulfone,
2-amino-4'-chloro-acetyl-amino-diphenyl-sulfone,
2-amino-4'-phenoxy-acetyl-amino-diphenyl-sulfone,
2-amino-4'-cinnamoyl-amino-diphenyl-sulfone,
2-amino-4'-succinyl-amino-diphenyl-sulfone,
2-amino-4'-phthaloyl-amino-diphenyl-sulfone,
2-amino-4'-beta-naphthyl-sulfonyl-amino-diphenyl-sulfone,
2-amino-3'-acetyl-amino-diphenyl-sulfone,
2-amino-3'-para-tolyl-sulfonyl-amino-diphenyl-sulfone,
2-amino-3'-chlor-acetyl-amino-diphenyl-sulfone,
2-amino-3'-benzoyl-amino-diphenyl-sulfone,
2-amino-2'-chlor-acetyl-amino-diphenyl-sulfone,
2-amino-2'-benzoyl-amino-diphenyl-sulfone and
2-amino-2'-benzene-sulfonyl-amino-diphenyl-sulfone.

In the specification and claims the term, substituted alkyl groups, refers to the groups —$CH_2CH_2OH$, —$C_2H_4OSO_3H$, —$CH_2COOH$,
—$C_2H_4SO_3H$ and —$CH_2C_6H_5$ The only coupling components which can be used with the above described diazo components to produce combinations similar to those described are 2-amino-6-sulfo-8-naphthol,
2-methyl-amino-6-sulfo-8-naphthol,
2-ethyl-amino-6-sulfo-8-naphthol and
2-hydroxy-ethyl-amino-6-sulfo-8-naphthol.

2-amino-diphenyl-sulfone derivatives coupled in acid medium to 2-amino-6-sulfo-8-naphthol in general give red dyes of good light fastness on wool. Their level-dyeing and good transferring properties decrease and their wet fastness and ability to dye under neutral conditions increase approximately with the increasing size of substituent groups, provided the latter do not produce solubility in water. It has been found that the presence of such groups as nitro, amino, substituted amino and alkoxy groups in the benzene ring containing the azo group deepens the shade and decreases the light fastness of the dyes with respect to the parent structure. In the dyes of the present invention, the substituted amino groups are in the benzene ring of the diphenyl-sulfone which is not connected to the azo group. Accordingly it has been found that these groups exert little effect on the shade or light fastness of the parent structure but do not affect the neutral dyeing strength of the parent structure particularly.

Accordingly any 2-amino-diphenyl sulfone can be used as the amino base which is represented by the formula

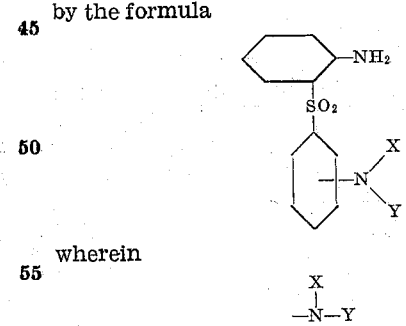

wherein $$-\overset{X}{\underset{}{N}}-Y$$

is one of a group consisting of mono- and disubstituted amino groups in which X is one of a group consisting of hydrogen, alkyl having 1 to 4 carbons and substituted alkyl; Y is one of a group consisting of

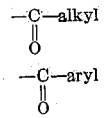

of the benzene series,

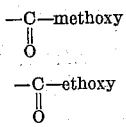

phenyl-sulfone, tolyl-sulfone and naphthyl-sulfone, wherein alkyl is from a group consisting of saturated and unsaturated aliphatic groups having 1 to 2 carbons and the mono-chloro, -phenyl, -phenoxy and -carboxy derivatives thereof and aryl is from a group consisting of phenyl, tolyl, monochloro phenyl, monosulfo phenyl and monocarboxy phenyl. Dyes having properties similar to those specifically described are produced by coupling these diazotized bases with any of the coupling components represented by the formula

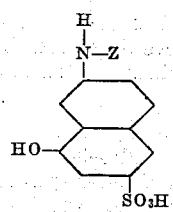

wherein Z is one of a group consisting of hydrogen, methyl, ethyl and hydroxyethyl.

The described dyes give good level dyeings on wool from neutral as well as from acid baths. The red shades produced thereby have excellent light fastness and other good general fastness properties desired in wool dyeings. The preferred modifications are those in which the coupling component is 2-amino-8-naphthol-6-sulfonic acid since they have the best light fastness and the shades of the dyeings are not as deep as those in which the amino group is alkylated. Among these, the modifications wherein the sulfone group is para substituted are the most desirable.

From the foregoing disclosure it will be recognized that the invention is susceptible of modification without departing from the spirit and scope thereof and it is to be understood that the invention is not restricted to the specific illustrations thereof herein set forth.

I claim:

1. An azo dye which is represented in its acid form by the formula

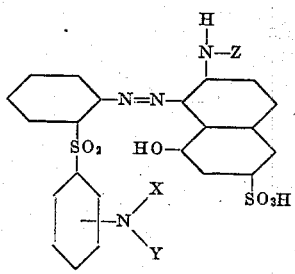

wherein

is one of a group consisting of mono- and di-substituted amino groups in which X is one of a group consisting of hydrogen, alkyl having 1 to 4 carbons, hydroxy ethyl, sulfato ethyl, sulfo ethyl, carboxy methyl and benzyl; Y is one of a group consisting of

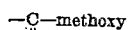

phenyl-sulfone, tolyl-sulfone, naphthyl-sulfone,

in which R is one of the group consisting of alkyl having 1 to 2 carbons and the mono-chloro, phenoxy and -carboxy derivatives thereof and

in which R' is one of the group consisting of phenyl, tolyl, monochloro-phenyl, monosulfo-phenyl and monocarboxy-phenyl; and Z is one of the group consisting of hydrogen, methyl, ethyl and hydroxy ethyl.

2. An azo dye which is represented in its acid form by the formula

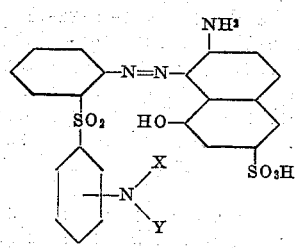

wherein

is one of a group consisting of mono- and di-substituted amino groups in which X is one of a group consisting of hydrogen, alkyl having 1 to 4 carbons, hydroxy ethyl, sulfato ethyl, sulfo ethyl, carboxy methyl and benzyl; Y is one of a group consisting of

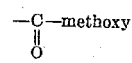

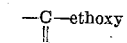

phenyl-sulfone, tolyl-sulfone, naphthyl sulfone,

in which R is one of the group consisting of alkyl having 1 to 2 carbons and the mono-chloro, phenoxy and -carboxy derivatives thereof and

in which R' is one of the group consisting of phenyl, tolyl, monochloro-phenyl, monosulfo-phenyl and monocarboxy-phenyl; and Z is one of the group consisting of hydrogen, methyl, ethyl and hydroxy ethyl.

3. An azo dye which is represented in its acid form by the formula

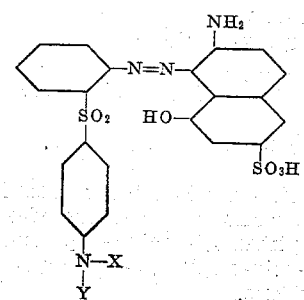

where

is one of a group consisting of mono- and di-substituted amino groups in which X is one of a group consisting of hydrogen, alkyl having 1 to 4 carbons, hydroxy ethyl, sulfato ethyl, sulfo ethyl, carboxy methyl and benzyl; Y is one of a group consisting of

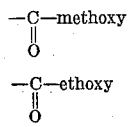

phenyl-sulfone, tolyl-sulfone, naphthyl-sulfone,

in which R is one of the group consisting of alkyl having 1 to 2 carbons and the mono-chloro, phenoxy and -carboxy derivatives thereof and

in which R' is one of the group consisting of phenyl, tolyl, monochloro-phenyl, monosulfo-phenyl and monocarboxy-phenyl; and Z is one of the group consisting of hydrogen, methyl, ethyl and hydroxy ethyl.

4. An azo dye which is represented in its acid form by the formula

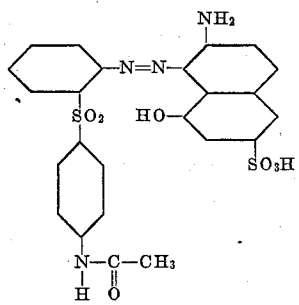

5. An azo dye which is represented in its acid form by the formula

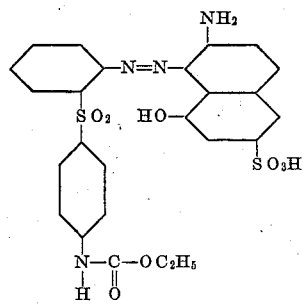

6. An azo dye which is represented in its acid form by the formula

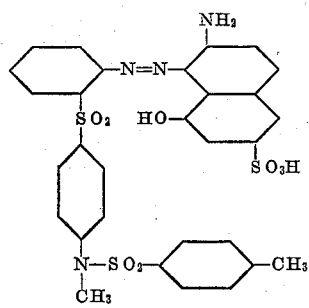

7. The process which comprises diazotizing a 2-amino-diphenyl sulfone represented by the formula

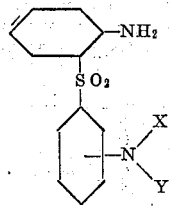

wherein

is one of a group consisting of mono- and di-substituted amino groups in which X is one of a group consisting of hydrogen, alkyl having 1 to 4 carbons, hydroxy ethyl, sulfato ethyl, sulfo ethyl, carboxy methyl and benzyl; Y is one of a group consisting of

phenyl-sulfone, tolyl-sulfone, naphthyl-sulfone,

in which R is one of the group consisting of alkyl having 1 to 2 carbons and the mono-chloro, phenoxy and -carboxy derivatives thereof and

in which R' is one of the group consisting of phenyl, tolyl, monochloro-phenyl, monosulfo-phenyl and monocarboxy-phenyl; and Z is one of the group consisting of hydrogen, methyl, ethyl and hydroxy ethyl; and coupling in a coupling medium with an 8-naphthol-6-sulfonic acid represented by the formula

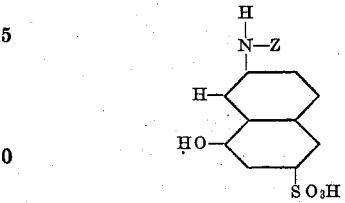

wherein Z is one of a group consisting of hydrogen, methyl, ethyl and hydroxyethyl; said coupling medium being adjusted so that the coupling occurs in the position indicated by the symbol —H.

8. The process which comprises diazotizing a 2-amino-diphenyl sulfone represented by the formula

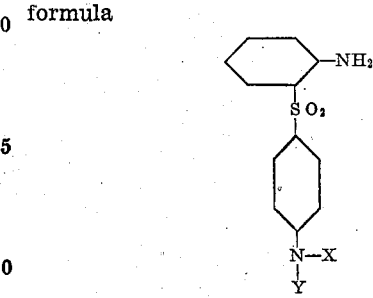

wherein

is one of a group consisting of mono- and di-substituted amino groups in which X is one of a group consisting of hydrogen, alkyl having 1 to 4 carbons, hydroxy ethyl, sulfato ethyl, sulfo ethyl, carboxy methyl and benzyl; Y is one of a group consisting of

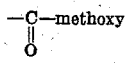

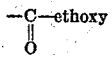

phenyl-sulfone, tolyl-sulfone, naphthyl-sulfone,

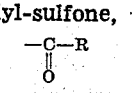

in which R is one of the group consisting of alkyl having 1 to 2 carbons and the mono-chloro, phenoxy and -carboxy derivatives thereof and

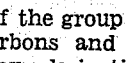

in which R' is one of the group consisting of phenyl, tolyl, monochloro-phenyl, monosulfo-phenyl and monocarboxy-phenyl; and Z is one of the group consisting of hydrogen, methyl, ethyl and hydroxy ethyl; and coupling in a coupling medium with an 8-naphthol-6-sulfonic acid represented by the formula

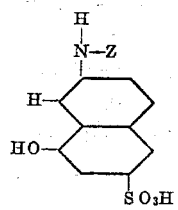

wherein Z is one of a group consisting of hydrogen, methyl, ethyl and hydroxyethyl; said coupling medium being adjusted so that the coupling occurs in the position indicated by the symbol —H.

DONOVAN E. KVALNES.